United States Patent [19]

Okiyama

[11] 4,420,528

[45] Dec. 13, 1983

[54] TRANSFER FILM FOR ELECTROPHOTOGRAPHIC COPIER

[75] Inventor: Toshiaki Okiyama, Tokyo, Japan

[73] Assignee: Fuji Photo Film Co., Ltd., Kanagawa, Japan

[21] Appl. No.: 461,713

[22] Filed: Jan. 28, 1983

Related U.S. Application Data

[63] Continuation of Ser. No. 278,029, Jun. 29, 1981, abandoned.

[30] Foreign Application Priority Data

Jun. 30, 1980 [JP] Japan .................................. 55-89415

[51] Int. Cl.[3] .......................... B32B 5/16; B32B 27/06

[52] U.S. Cl. .................................... 428/220; 428/323; 428/338; 428/409; 428/419

[58] Field of Search ............... 428/419, 323, 409, 220, 428/338, 216

[56] References Cited

U.S. PATENT DOCUMENTS

| | | | |
|---|---|---|---|
| 4,167,605 | 9/1979 | Attwood et al. | 428/419 |
| 4,286,015 | 8/1981 | Yoshida et al. | 428/419 X |
| 4,352,847 | 10/1982 | Okiyama | 428/141 |

*Primary Examiner*—Thomas J. Herbert, Jr.
*Attorney, Agent, or Firm*—Sughrue, Mion, Zinn, Macpeak & Seas

[57] ABSTRACT

A transfer film for an electrophotographic copier comprising a polysulfone resin is disclosed. The film is matted and has a dynamic friction coefficient of from 0.6 to 2.0, a static friction coefficient of from 0.8 to 2.3, a surface resistance of from $1\times10^{10}$ to $1\times10^{15}$ ohms, at least one side of said film having a surface roughness of 1.0 micron or more.

2 Claims, No Drawings

TRANSFER FILM FOR ELECTROPHOTOGRAPHIC COPIER

This is a continuation of application Ser. No. 278,029, filed June 29, 1981, now abandoned.

FIELD OF THE INVENTION

This invention relates to a transfer film for an electrophotographic copier which operates on the xerographic system. More particularly, it relates to a transfer film for an electrophotographic copier comprising a matted polysulfone resin, said film having a dynamic friction coefficient of from 0.6 to 2.0, a static friction coefficient of from 0.8 to 2.3, a surface resistance of from $1\times10^{10}$ to $1\times10^{15}$ ohms, at least one side of said film having a surface roughness of 1.0 micron or more.

BACKGROUND OF THE INVENTION

Tracing paper has in most cases been used as transfer paper in electrophotographic copiers operated by the xerographic system. However, tracing paper does not have satisfactory dimensional stability, keeping quality, mechanical strength and water resistance. When these properties are required, matted films (tracing film) made of polyethylene terephthalate resin (hereunder referred to as PET resin) or cellulose triacetate resin (hereunder referred to as CTA resin) have been used as transfer film. To achieve good fixation between toner and transfer film, the thermal fixation assembly of the electrophotographic copier must be kept at a high temperature. When the heating mechanism of that assembly is of radiant-heating type, it is particularly important that the assembly is kept at a temperature of at least 250° C. or even higher than 300° C. If the PET film or CTA film whose heat resistance is not adequate is used as transfer film, they undergo significant rippling (i.e., formation of waves on the surface) during thermal fixation that considerably impairs their flatness and at the same time, shrinks them to a great extent. If the temperature of the thermal fixation is not high enough to cause rippling of the film, the toner is fixed to the film so weakly that it easily separates from the film. Furthermore, the conventional heat resistant transfer film does not have satisfactory writing quality or adequate fixation to toner. "Writing quality" refers to the ability of a transfer film to be written on with pencil, ink, or the like; this is an important property for a transfer film, in that it is often desirable to modify an image on a transfer film by ordinary writing thereon. As a further disadvantage, the conventional transfer film is too transparent to be easily detected when it gets stuck in the electrophotographic copier. Most electrophotographic copiers use the principle of light shielding to detect a stuck paper or film in the machine, but a transparent film is not detected if it gets stuck and hence the machine does not stop.

I previously made various studies on an improved transfer film having none of the problems described above, that is, a transfer film for an electrophotographic copier that can be used in an electrophotographic copier using a radiant-heating or other high temperature type of thermal fixation assembly without undergoing rippling to impair the film flatness and which has an extremely small heat shrinkage ratio, has good fixation to toner and which has improved writing quality. As a result, I accomplished an invention for which patent was applied as Japanese patent application No. 44028/79 (corresponding to U.S. patent application Ser. No. 140,400, filed Apr. 14, 1980, now U.S. Pat. No. 4,352,847). According to one aspect of that invention, a transfer film made of heat resistant plastics having a UL (Underwriters Laboratories) temperature index of 120° C. or more retained high film flatness without undergoing rippling, had a extremely small heat shrinkage ratio and achieved good fixation to the toner even if it was processed by an electrophotographic copier of the type that maintained the thermal fixation assembly at an elevated temperature. According to another aspect of that invention, a film at least one side of which was matted to a surface roughness of 1.0 micron or more (1) had improved fixation to toner because of fused toner adhered to both projections and recesses in the surface and (2) that film had writing quality and could be used not only as an intermediate but also as ordinary writing paper. According to still another aspect of that invention, a film having an opacity (as measured according to the method specified in JIS P8138-1976) of from 20 to 65% had the advantage of (2) and yet could be detected as easily as ordinary paper when it got stuck in the electrophotographic copier of today, such as Xerox 3600, 2400, 9200 and 7200 which use the principle of light shielding to detect a stuck paper. However, such a method does not stop the machine even if transparent paper or a transparent film gets stuck in the machine, and the operator does not know where the film is. In contrast, the transfer film having an opacity of 20 to 65% can be easily detected if it is stuck and the operator can readily find its location. The specification of Japanese patent application No. 44028/79 mentions a polysulfone resin as an example of the plastics having the properties described above.

Even the transfer film for electrophotographic copier proposed in Japanese patent application No. 44028/79 has several problems. If its surface resistance is high, it does not run (pass) through the photographic copier smoothly and is easily stuck. In addition, the toner particles pop (i.e., explode) over the film and as a result, a sharp image is not produced. If the film has a high friction coefficient, two layers of the film easily cohere and run through the machine simultaneously or they won't run (pass) through the machine smoothly.

SUMMARY OF THE INVENTION

Therefore, one object of this invention is to provide an improved transfer film for electrophotographic copier that has none of the defects described in the preceding paragraphs. This object is achieved effectively by a matted transfer film of polysulfone resin having a dynamic friction coefficient of 0.6 to 2.0, a static friction coefficient of 0.8 to 2.3, a surface resistance of $1\times10^{10}$ to $1\times10^{15}$ ohms and at least one side of which has a surface roughness of 1.0 micron or more. More particularly, a transfer film for electrophotographic copier having the above-defined values can be provided by incorporating an organic or inorganic additive in a polysulfone resin.

DETAILED DESCRIPTION OF THE INVENTION

A typical example of the polysulfone resin for use in this invention is available from Union Carbide Corp., U.S.A. under the trade name "Polysulfone" whose chemical structure is:

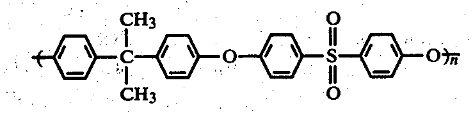

(n=50-80). The "Polysulfone" has a UL temperature index of 140° C. The UL temperature index is determined by the method specified in UL 746-B and has been used as an index indicative of the heat resistance of plastics. See, for example, *The Modern Plastics Encyclopedia*, 1978–1979 Edition, pp. 617–652 for the UL temperature index of various plastics. "Surface roughness" referred to herein can be determined by a number of methods. One such method is JIS B0601-1976. The surface roughness value can be obtained first by resolving the deflection of the indicator of a surface roughness meter (SURFCOM-3B (trade name) manufactured by Tokyo Seimitsu Co., Ltd., Japan) into X- and Y-axis components, magnifying said components by 7,000 times, projecting the magnified image directly onto a plane, taking a picture of the projected image, and finally dividing the recorded maximum roughness by the magnification power.

Suitable examples of the organic or inorganic additives useful in this invention include additives which are nontoxic, lubricate and prevent static buildup on the polysulfone resin, and yet are inactive to the resin. See, for example, *Handbook of Rubber & Plastic Compounding Chemical*, Rev. Ed., Rubber Digest Corporation, pp. 303–325 for illustrative organic or inorganic additives. Preferred examples of the inorganic additives are $SiO_2$, $TiO_2$, ZnO, $Al_2O_3$, $CaCO_3$, MgO, $MgCO_3$, $CaSO_4$, $BaSO_4$ and kaolin, and peferred examples of the organic additives are aliphatic acid compounds such as zinc stearate. These additives may be used either alone or in combination. The additive preferably has an average particle size of about 5 nm to 5 μm. The additive is incorporated in the polysulfone resin in an amount of 0.01 to 20%, preferably 0.03 to 5%, based on the weight of the resin. The additive is incorporated in the polysulfone resin in a conventional manner, and the blend is shaped into a film by a known method such as solvent casting or melt extrusion.

The film should be neither too thin nor too thick. If it is too thin (i.e., less than 25 μm), it cannot be passed through the electrophotographic copier without forming wrinkles and hence it is difficult to handle. If the film is too thick (i.e., more than 100 μm), it cannot be stored at low cost, and besides, when it is fed into the eletrophotographic copier, the marginal area of the film that is held by the grips that guide the running of the film has a tendency to bend and the toner fixes to that area poorly. Therefore, the film thickness is preferably in the range of from 25 to 100 μm.

The transfer film for electrophotographic copier according to this invention has a surface resistance (as measured according to the method specified in JIS K6911-1979) of from $1\times10^{10}$ to $1\times10^{15}$ ohms, preferably from $1\times10^{12}$ to $8\times10^{14}$ ohms. In this connection, a film made of only the polysulfone resin (without any additive) has a surface resistance of from $1\times10^{16}$ to $1\times10^{18}$ ohms. The transfer film of this invention has a dynamic friction coefficient of from 0.6 to 2.0, preferably from 1.0 to 1.6, and a static friction coefficient of from 0.8 to 2.3, preferably from 1.5 to 2.0. The dynamic and static friction coefficients as used herein are measured by the method essentially the same as specified in ASTM D 1894-1978: a given load is rubbed against a sample and the resulting friction measured by a guage is converted into the respective coefficients by given formulas. More specifically, using a slip tester as a measurement apparatus, a sample (side A measuring 105×350 mm, side B measuring 65×280 mm) is held at 23° C. and 65% in relative humidity for 5 hours; a sled metal measuring 85×65 mm and whose weight (p) is 500 g is placed on the film and slid at a speed of about 0.2 m/min. The static and dynamic friction coefficients are calculated from the maximum static frictional force (f) and kinetic frictional force (f') by the following formulas:

$$\text{Static friction coefficient } (\mu_S)=f/p$$

$$\text{Dynamic friction coefficient } (\mu_D)=f'/p$$

The film can be given a surface roughness of 1.0μ or more by various matting techniques, which include (1) the band mat method wherein a matted film is directly produced by casting a liquid blend onto the satinized surface of a casting machine or a drum or an endless band having a matted surface; (2) the sand blast method wherein sand is blasted onto a wound transparent film to give a matted surface; (3) the surface saponification method wherein a transparent film is immersed in an alkali saponifying solution to give a matted surface; and (4) the coating method wherein a matted layer is formed by applying onto a transparent film a solution containing a matting agent or a binder. Any of these methods can be used to provide the transfer film of this invention. The matted film of this invention thus produced must have a surface roughness of 1.0μ or more. A film whose surface roughness is less than 1.0μ does not have a good writing quality and generally is not suitable for use as a transfer film. For most purposes, the film has a surface roughness of less than 20μ, preferably between 2 and 10μ. To give a desired surface roughness by the matting techniques described above, the roughness of the surface of the band, the grain size of the sand blasted or other parameters may be controlled, and the specific requirements can be easily found by those skilled in the art upon reading this disclosure.

The film can be made opaque by any of the matting methods described above. If desired, a pigment such as titanium oxide, zinc oxide or silicon dioxide may be incorporated in the matted film. The film preferably has an opacity (as determined by JIS P8138-1976) of 20 to 65%, more preferably from 25 to 55%. A film having an opacity of less than 20% cannot be detected if it is stuck in the electrophotographic copier, and a film having an opacity of more than 65% does not have high copying quality when use as an intermediate.

The matted transfer film of this invention has a dynamic friction coefficient of 0.6 to 2.0, a static friction coefficient of 0.8 to 2.3, a surface resistance of $1\times10^{10}$ to $1\times10^{15}$ ohms, and at least one side of the film has a surface roughness of 1.0μ or more. When the film was passed through an electrophotographic copier of the type wherein the thermal fixation assembly was kept a high temperature, such as Xerox 2080 for large scale drawings (product of Fuji Xerox Co., Ltd.), it underwent no rippling and retained a high degree of flatness and dimensional stability, had good fixation to toner, and exhibited good writing quality. As a further advantage, the transfer film of this invention having an opacity of 20 to 65% could be detected very easily when it got stuck in the photographic copier.

This invention is now described in greater detail by reference to the following examples and comparative examples which are given here for illustrative purposes only and are by no means intended to limit the scope of this invention.

EXAMPLES 1 TO 4 AND COMPARATIVE EXAMPLES 1 AND 2

Samples of "Udel", a polysulfone resin produced by Union Carbide Corp., U.S.A. (UL temperature index= 140° C.) were heated at 150° C. for 4 hours. The preheated polysulfone resin samples were mixed with the additives shown in Table 1 in the amounts indicated in Table 1, and the mixtures were melt-extruded at 370° C. and quenched on a casting drum held at 40° C. to thereby produce undrawn film samples. One or both surfaces of the resulting polysulfone film samples were matted to provide samples of transfer film for an electrophotographic copier. Table 1 sets forth the properties of the transfer film samples.

TABLE 1

| | Example | | | | Comparative Example | |
|---|---|---|---|---|---|---|
| | 1 | 2 | 3 | 4 | 1 | 2 |
| Composition (wt %) | | | | | | |
| Udel (polysulfone) | 100 | 100 | 100 | 100 | 100 | 100 |
| Zinc stearate | 0.05 | | 0.05 | 0.1 | | |
| Silica | 1.0 | 0.5 | 0.5 | | 0.008 | |
| Calcium carbonate | 1.5 | 1.0 | | | | |
| Kaolin | | | | 3.0 | | |
| Surface resistance (Ω) | $5 \times 10^{13}$ | $2 \times 10^{14}$ | $5 \times 10^{14}$ | $4 \times 10^{14}$ | $6 \times 10^{15}$ | $1 \times 10^{16}$ |
| Dynamic friction coefficient | 1.2 | 1.5 | 1.4 | 1.1 | 2.4 | 2.7 |
| Static friction coefficient | 1.6 | 1.9 | 1.8 | 1.7 | 2.6 | 3.1 |
| Film thickness (μm) | 70 | 100 | 50 | 50 | 70 | 70 |
| Matting | Sand blasting One side | Coating One side | Sand blasting Both sides | Sand blasting Both sides | Sand blasting One side | Sand blasting One side |
| Surface roughness (μ) | 4.0 | 4.5 | 3.5 | 3.5 | 4.2 | 4.5 |
| Opacity (%) | 42 | 51 | 49 | 47 | 41 | 43 |
| Running property (1) | 0/100 | 0/100 | 0/100 | 0/100 | 86/100 | 100/100 |
| Frequency of the case where more than one sheet were fed simultaneously (2) | 0/100 | 0/100 | 0/100 | 0/100 | 92/100 | 100/100 |
| Quality of copied image | o | o | o | o | Δ~x | x |
| Overall evaluation | o | o | o | o | x | x |

Criteria for evaluation: o good (acceptable), Δ fair, x not good (rejected)
(1): Indicated by the number of sheets that could be passed through Xerox 2080 (product of Fuji Xerox Co., Ltd.) without sticking. (0/100 means none of the 100 sheets supplied stuck.)
(2): Indicated by the frequency of the case where more than one of the sheets stacked on the feed tray of Xerox 720 (product of Fuji Xerox Co., Ltd.) were passed through the machine simultaneously (0/100 means no two out of the 100 sheets were fed through the machine simultaneously).

While the invention has been described in detail and with reference to specific embodiments thereof, it will be apparent to one skilled in the art that various changes and modifications can be made therein without departing from the spirit and scope thereof.

What is claimed is:

1. A transfer film of the type used in connection with an electrophotographic copier, comprising:
polysulfone resin, wherein said film comprised of polysulfone resin is matted and has a dynamic friction coefficient of from 0.6 to 2.0, a static friction coefficient of from 0.8 to 2.3, comprises an inorganic or organic particulate additive in an amount to provide a surface resistance of from $1 \times 10^{10}$ to $1 \times 10^{15}$ ohms, wherein at least one side of said film has a surface roughness of 2.0 micron or more, said film being self-supporting and having a thickness of from 25 to 100 μm.

2. A transfer film as claimed in claim 1, wherein said film has an opacity of from 20 to 65%.

* * * * *